Aug. 5, 1969 W. T. McMICHAEL 3,459,924

ELECTRICAL OPEN CELL HEATING ELEMENT

Filed Sept. 25, 1968

INVENTOR.
Wallace T. McMichael
BY
AGENT

United States Patent Office 3,459,924
Patented Aug. 5, 1969

3,459,924
ELECTRICAL OPEN CELL HEATING ELEMENT
Wallace T. McMichael, Lake Jackson, Tex., assignor to The Dow Chemical Company, Midland, Mich., a corporation of Delaware
Continuation-in-part of application Ser. No. 595,744, Nov. 21, 1966. This application Sept. 25, 1968, Ser. No. 762,395
Int. Cl. H05b 3/16
U.S. Cl. 219—543    7 Claims

ABSTRACT OF THE DISCLOSURE

Electrical heating elements are disclosed which are prepared from open cell plastic foam, the heating elements having a continuous electrically conductive coating over the surface of the cells and electrodes in contact with spaced apart portions of the coating to permit the passage of an electrical current therethrough. The open-celled heating elements permit the passage of liquids and gases therethrough.

---

This application is a continuation-in-part of my copending application Ser. No. 595,744, filed Nov. 21, 1966, now abandoned.

This invention relates to an improved heating element, and more particularly relates to an improved heating element having high surface and composed primarily of synthetic resinous material.

Oftentimes, it is desirable to provide heating elements which are required to supply relatively low power per unit area of exposed surface, and oftentimes it is desirable in such elements to have a chemically resistant coating on the surface thereof. Frequently, it is desirable to provide a heating element which can also serve the dual function of filter and heat exchange element. Beneficially, it is desirable if such a filter or heating element is readily replaceable. Oftentimes it is also desirable to provide thermal insulation as well as a heating means such as an insulation for conduits which carry materials that are subject to freezing or exhibit undesirable viscosity increases at low temperature.

It would be advantageous if there were available an improved heating element which was generally resistant to materials which corrode metals and is readily replaceable at a moderate cost in case of damage.

These benefits and other advantages in accordance with the present invention are achieved in a heating element which comprises a rigid open cell synthetic resinous structure having a plurality of interconnecting cells which permit the passage of the fluid therethrough, the rigid cellular structure having on the surface of the cells a continuous conductive coating in a synthetic resinous binder, at least a first electrode and a second electrode adapted to supply electrical current to the electroconductive coating and thereby generate the heat by the passage of an electrical current therethrough.

Further features and advantages of the present invention will become more apparent from the following specification when taken in connection with the drawing wherein:

In FIGURE 1 there is schematically depicted a sectional view of the heater in accordance with the present invention.

In FIGURE 2 there is a schematic sectional view of the heater of FIGURE 1 taken along the line 2—2 thereof.

Figure 1:
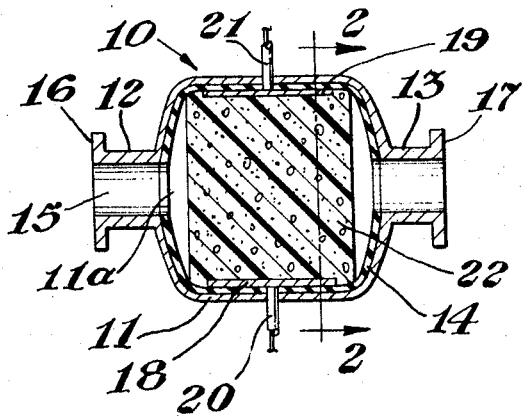

In FIGURE 1 there is schematically depicted a heater generally designated by the reference 10. The heater 10 comprises a housing 11. The housing 11 has a first end 12, a second end 13 and an electrically insulating lining 14. The housing 11 defines an internal passageway 15. The passageway 15 extends from the first end 12 to the second end 13. The first end 12 defines a flange or connecting means 16 and the second end 13 has a generally similar flange or connecting means 17. The flange is adapted to mate with piping. The housing 11 defines an enlarged portion 11a between the first and second ends 12 and 13, respectively. Disposed within the enlarged portion 11a is a first electrode or contact means 18 and a second electrode or contact means 19. The electrodes 18 and 19 have power supply means or insulated cables 20 and 21 in operative communication therewith. Disposed within the housing portion 11a is an open cell cellular body 22. The body 22 defines a plurality of open interconnecting cells which provide communication between the first end 12 and a second end 13 of the housing 11. An electroconductive coating is disposed on the surfaces defining the cells and is in operative communication with the electrodes 18 and 19.

Figure 2:
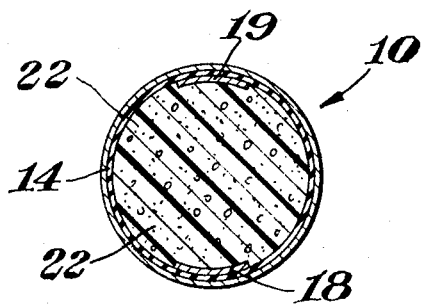

FIGURE 2 is a sectional view of the heater 10 taken along the line 2—2 thereof depicting a relationship between the housing 11, the electrodes 18 and 19, the cellular body 20 and the insulating lining 14.

Heaters such as are depicted in FIGURES 1 and 2 are readily constructed employing a wide variety of materials. Either a plastic or metal housing may be used. If a plastic housing is used, the insulating layer 11 can be omitted. The housing may be a one piece housing or a two piece housing with the portions joined by any convenient means such as flanges and bolts or a suitable adhesive such as an epoxy resin. The heating element may be formed within the housing or external to the housing and subsequently installed therein. Employing a flexible foam, the foam may be coated with a conductive coating, placed within the housing in such a manner that the coating contacts the electrodes, the coating dried or cured and an insulating or protective coating may then be applied over the conductive coating by the simple expedient of filling the cavity with the coating material and subsequently permitting the coating material to drain from the open cell foam prior to curing at an elevated temperature. Alternately, the entire coating procedure may take place external to the housing and the rigid heating element with electrodes subsequently installed. Optionally, the heating element may be adhered to the housing if a substantial pressure drop will occur across the heating element, or alternately, if the flexible foam for the preparation of the heating element has a size slightly greater than the diameter of the housing and the foam is forced into the housing, a tight fit is obtained and usually no specific adhering of the foam to the housing is required.

Figure 3:
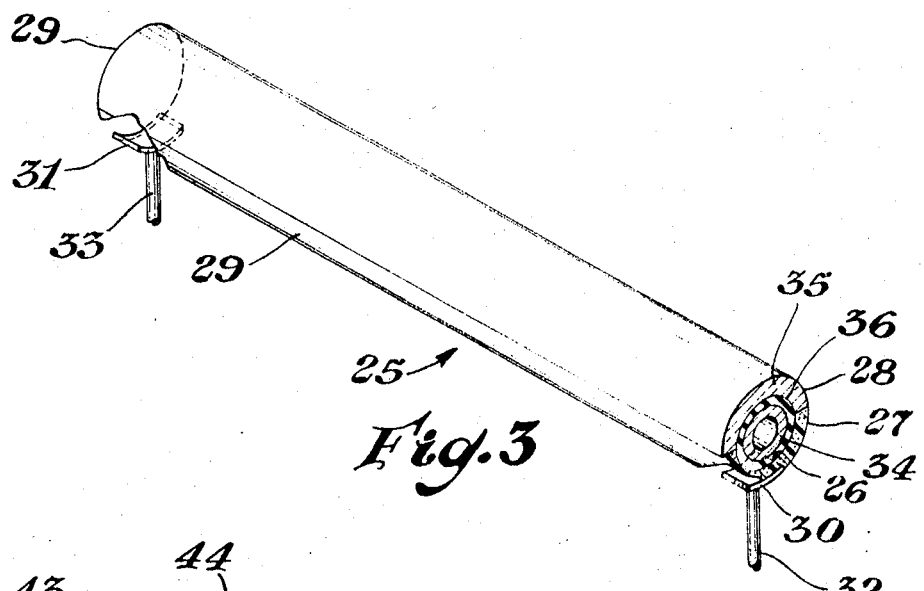
FIGURE 3 is a schematic view of an alternate heater in accordance with the present invention.

In FIGURE 3 there is schematically depicted a partially cutaway view of a heater in accordance with the present invention generally designated by the reference numeral 25. The heater 25 has a semi-cylindrical elongate configuration and a concave side 26 and a convex side 27. The heater 25 has a first end 28 and a second end 29. The heater 25 is composed of an open cell structure having an electroconductive coating on the surface thereof. A first electrode 30 is disposed at the first end of the heater 25 and the second electrode 31 at the second end thereof. The electrodes 30 and 31 are in operative communication with the electroconductive coating and electrical power source (not shown) by means of conductors 32 and 33, respectively. The concave side 26 of the heater is in contact with an electrical insulator 36 surrounding a conduit 34. A semi-cylindrical insulating body 35 is oppositely disposed to the heater 25. The insulating body 35 and the heater 25 in operative combination form a whole cylindrical body about the conduit 34. Application of electrical power to the electrodes 30 and 31 cause heat to be produced in the heater 25.

Figure 4:
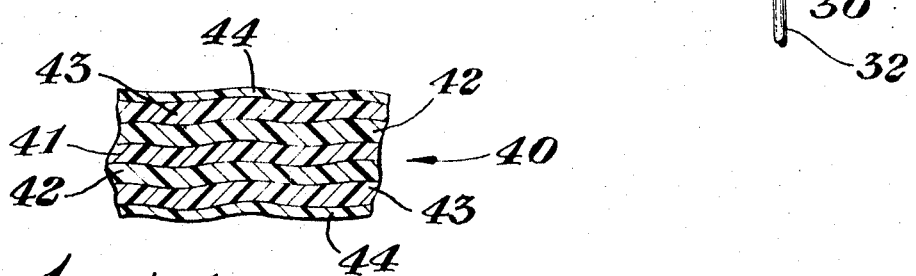
FIGURE 4 is a greatly enlarged view of a cell wall of the heating elements employed in the heaters of FIGURES 1-3.

In FIGURE 4 there is schematically depicted a greatly enlarged view of a portion of a cell wall of the heater in accordance with the invention generally designated by the reference numeral 40. The cell wall portion 40 comprises a flexible synthetic resinous material 41 which originally formed a cell wall portion of a flexible open-celled foam. The material 41 is coated on either side with a hardened synthetic resinous material 42 thereby providing a rigid open-celled structure. Adjacent the layers of hardened material 42 are electroconductive layers 43 composed of a particulate electrically conductive material within a synthetic resinous matrix. Electrical insulating layers 44 are disposed over the electroconductive layers 43.

Heaters in accordance with the present invention are readily prepared employing the method generally as set forth in United States Letters Patent 3,269,887 wherein a flexible open-celled foam is impregnated with a resinous material which hardens after a brief interval to produce a tough, rigid foamed body. Heaters in accordance with the present invention are readily prepared by coating such hardened flexible open-celled foams with an electroconductive coating or hardening the foam with an electroconductive coating such as particulate graphite, ground coke or like carbonaceous conducting materials in a synthetic thermoplastic binder.

Various electroconductive coatings or resistance coatings may be applied to the surface of insulating materials. Particularly beneficial and advantageous are particulate coke coatings having a binder of a synthetic resinous material.

It has now been found that the use of petroleum coke is superior to the use of carbon black and graphite and produces coatings having improved tensile strength, uniformity in electrical conductance and heat-generating characteristics over long periods of use. Petroleum coke has been found to be more easily dispersed in the coating compositions generally providing a composition much easier to apply than equivalent coatings using graphite or carbon black. Equivalent composition coatings using graphite or carbon tend to be much more difficult to work with and are not so easily applied as the coke coatings.

The calcined petroleum coke useful in the present heaters is preferably 94 percent screened through a 100 mesh screen (Tyler equivalent). The concentration of coke, on a dry basis beneficially is from about 95 percent to about 50 percent, and preferably should be about 90 percent. Calcined petroleum coke, its properties and manufacture, are well known and available commercially from many sources. It is described in great detail in (1) Thomas, C. L., "Petroleum Coke and Coking," Advances in Chemical Series (1951) No. 5; and (2) Weber, G., "Petroleum Coke," Oil and Gas Journal (Mar. 22. 1954) 52, No. 46, pp. 151–154; and in many other such sources. A relatively new process for manufacturing petroleum coke is reported in "The Lummus Continuous Contact Coking Process," Petroleum Refiner, V. Meklen et al., (December 1953) 32, No. 12, p. 131.

Typical calcined petroleum coke properties are found in the following table.

Table I.—Calcined petroleum coke

| Property: | Value |
| --- | --- |
| Volatile matter (maximum), percent | 0.5 |
| Ash, percent | 0.5 |
| Iron, percent | 0.03 |
| Silicon, percent | 0.05 |
| Sulfur, percent | 1.0–2.0 |
| Moisture (maximum), percent | 0.5 |
| Real density (gram/centimeter $^3$) | 2.01–2.07 |

The latex is a desirable binder for the conducting carbon particles in that it serves to maintain the particles in fixed relationship to each other in the electrically resistive coating and to adhere the coating to the base. The binder must be one which resists deterioration from oxidation, moisture and the like at room and operating temperature, and must maintain good adherence to the non-conducting base and to the carbon particles as thermal expansion forces are exerted during normal and rapid changes in temperature. The binder should not deteriorate nor detrimentally affect the electrical resistance of the coating at room temperature up to normal operating temperature and slightly above.

A number of latex binders are satisfactory for this purpose and particularly satisfactory results have been obtained with a copolymer of styrene-butadiene with acrylic acid and fumaric acid as an additional comonomer. Other useful latex compositions include vinylidene chloride-acrylonitrile copolymer, polyvinyl acetate and ethyl acrylate-methylmethacrylate copolymer with methacrylic acid and acrylic acid.

The amount of latex useful for the present invention is from about 5 percent to about 50 percent, and preferably, about 10 percent, calculated on a dry basis. The latex is preferably water dispersible and should provide an adherent, tack-free coating when compounded with the other ingredients of the present invention.

Enough water is added to the composition to provide dispersibility to the latex and the petroleum coke. The preferred amount of water in the finished composition is from about 35 percent to about 22 percent, depending on the thickness or viscosity of composition desired.

To aid in dispersing the coke in the coating composition, it is useful to use a dispersant such as the sodium salt of a carboxylated polyelectrolyte (Tamol 731 Dispersant—Rohm & Haas). The amount used is from about 0.01 to about 1.0 percent, and preferably about 0.1 percent. Other additives are also useful, such as methyl cellulose (Methocel 90 HG–DGS, 50,000 centipoises—The Dow Chemical Company). The preferred amount is from about 0.01 to about 1.0 percent, and preferably, about 0.02 percent. Methyl cellulose aids the composition in improving thickness and spreadability. Methyl cellulose is not critical and can be omitted without affecting the performance of the heat-producing coating composition.

Advantageously, such conductive coatings are readily applied to a hardened open cell foam by dipping and draining or alternately the coatings will be applied to a flexible foam prior to applying the hardening material. Suitable electrodes are embedded in desired locations in the body prior to the application over the electroconductive coating. Beneficially, such electrodes can be relatively thin foils or wires of metals which are chemically inert under the conditions which the heater will be used.

By way of further illustration, a sheet of polyether polyurethane open-celled flexible foam, one foot wide, 4 feet long and a quarter of an inch thick, having a density of 1.5 pounds per cubic foot is saturated with a diglycidyl ether of Bisphenol-A containing diethylenediamine as a curing agent. The impregnated foam is passed between a pair of rolls to remove excess resin. The sheet is then curved about the periphery of a 4 inch diameter glass pipe to form a semi-cylindrical configuration. After curing, the sheet is separated from the pipe and a number 8 Brown and Sharpe solid copper wire is embedded in each end of the sheet to form first and second electrodes, the copper wire extending transversely across each end of the sheet. A coating composition is formulated by admixing 10 parts of calcined petroleum coke powder which passes through a 100 mesh screen (Tyler equivalent) and is subsequently admixed with 5 parts by weight of water and 5 parts by weight of a styrene-butadiene latex. The styrene-butadiene latex is prepared from 80 parts by weight styrene and 20 parts by weight butadiene. The latex is 48 percent by weight solids. The mixture is agitated mechanically until it appears uniform and 0.7 part by weight of an aqueous solution containing 2½ percent by weight of hydroxymethyl cellulose having a solution viscosity of 4000 centipoises is added. (The solution viscosity is the viscosity of a 2 weight percent aqueous solution at 25° C.) The resulting mixture is diluted with 5 parts by weight water. The hardened curved foamed body is then impregnated with the coating composition and shaken vigorously to dislodge coating composition and dried in an air oven at a temperature of about 50° C. A dispersion of 20 parts by weight of a copolymer of 80 weight percent vinylidene chloride and 20 weight percent acrylonitrile in the form of an aqueous latex is applied to the coated foamed body. The body is again shaken to dislodge excess coating material and dried at 50° C. in an air oven. The body is permeable to liquids and gases and on application of electrical current to electrodes is readily raised to a temperature of 150° F. Water, dilute hydrochloric acid and aqueous methanol are conveniently heated and passed through the porous heating element. The porous heating element is also eminently satisfactory as a heater in combination with a 4 inch glass pipe carrying phenol which periodically must be heated to liquefy the phenol.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. An electrical heating element comprising a rigid open cell synthetic resinous foam structure having a plurality of interconnecting cells which permit the passage of fluid therethrough, the rigid cellular structure having a continuous electrically conductive coating conforming to the cell defining surfaces and at least a first electrode and a second electrode in electrical contact with spaced apart portions of the coating, the electrodes adapted to supply electrical current to the electroconductive coating and thereby generate heat by the passage of an electrical current therethrough.

2. The heating element of claim 1 in cooperative combination with a housing, the housing defining a passage, the heater being peripherally adhered to the housing.

3. The heating element of claim 1 wherein the rigid cellular structure comprises a flexible foam having disposed on the surface thereof a hardenable resin in a quantity sufficient to form a rigid structure.

4. The heating element of claim 1 wherein the electroconductive coating comprises calcined petroleum coke.

5. The heating element of claim 1 wherein an electrically insulating coating is disposed on the surface of the electroconductive coating.

6. The heating element of claim 1 having a generally cylindrical configuration and adapted to at least partially enclose a cylindrical body.

7. The heating element of claim 1 wherein the rigid cellular structure comprises a flexible urethane foam and an epoxy resin.

References Cited

UNITED STATES PATENTS

| 2,401,797 | 6/1946 | Rasmussen | 165—180 X |
|---|---|---|---|
| 3,075,494 | 1/1963 | Toulmin | 117—98 X |
| 3,125,739 | 3/1964 | Deibel et al. | 338—99 |
| 3,176,116 | 3/1965 | Lichter | 219—543 X |
| 3,364,337 | 1/1968 | Kahn | 219—301 |

VOLODYMYR Y. MAYEWSKY, Primary Examiner

U.S. Cl. X.R.

117—98; 165—180; 219—301, 535, 536